United States Patent [19]
Bullock et al.

[11] Patent Number: 5,458,535
[45] Date of Patent: Oct. 17, 1995

[54] FISH-BEHEADING APPARATUS AND PROCESS

[75] Inventors: Kenneth W. Bullock; Belvin L. Graham, both of Seattle, Wash.

[73] Assignee: Smith Berger Marine, Inc., Seattle, Wash.

[21] Appl. No.: 158,138

[22] Filed: Nov. 26, 1993

[51] Int. Cl.$^6$ ................................................ A22C 25/14
[52] U.S. Cl. ........................... 452/64; 452/157; 452/163; 452/108; 452/170; 452/180
[58] Field of Search ................ 452/64, 157, 163, 452/108, 110, 170, 180, 179

[56] References Cited

U.S. PATENT DOCUMENTS

| | | | |
|---|---|---|---|
| 2,245,330 | 6/1941 | Danielsson | 452/180 |
| 2,920,343 | 1/1960 | Bartels et al. | 452/170 |
| 4,463,478 | 8/1984 | Hartmann et al. | 452/170 |
| 5,083,972 | 1/1992 | King | 452/108 |
| 5,106,334 | 4/1992 | Kristinsson | 452/108 |

FOREIGN PATENT DOCUMENTS

| | | | |
|---|---|---|---|
| 640196 | 4/1962 | Canada | 452/64 |
| 3103661 | 9/1982 | Germany | 452/64 |

Primary Examiner—Willis Little
Attorney, Agent, or Firm—Robert W. Beach

[57] ABSTRACT

The head of a fish is severed from the fish body in a two-stage operation, in the first stage the root of the fish head beneath the gill covers being cut partway through and in the second stage the severance of the fish head from the fish body being completed. The first stage cutting operation is effected by cooperating disk cutters converging toward the fish head at an acute angle, means for sensing the thickness of a fish, and means for adjusting the spacing of the disk cutters in accordance with the thickness of the fish sensed. The fish are transported unidirectionally, and the spacing of the cutting disks is adjusted while the cutters are being reciprocated in the same direction of the travel as the fish is transported, and the disk cutters are then reciprocated in the direction opposite the direction of transport of the fish to effect the first stage cutting operation.

11 Claims, 8 Drawing Sheets

FISH-BEHEADING APPARATUS AND PROCESS

BACKGROUND OF THE INVENTION

1. Field of the Invention

This invention relates to apparatus and process for severing the head from the body of a fish in a manner to preserve with the fish body the maximum amount of edible meat.

2. Prior Art

Particularly the head of a salmon has been severed from the body mechanically in the past, principally by the use of an "iron chink" which utilized a chopping knife that chopped through the fish when lying on its side and was contoured to cut the head at its root generally along the conformation of the pectoral girdle. The difficulty with use of such a chopping knife was that the cut must be perpendicular to the longitudinal central plane of the fish so that either part of the bone around the root of the fish head was not removed or, if the location of the cut was sufficiently far rearward to remove all of the bone, some of the edible meat of the fish at the root of the fish head near the back of the fish also would be severed and wasted.

SUMMARY OF THE INVENTION

The principal object of the invention is to provide apparatus for mechanically severing the head of a fish from its body in a manner to preserve with the body as much of the edible meat of the fish as possible while removing the bone and inedible parts at the root of the head.

In accomplishing the aforesaid principal object, it is an object to provide apparatus which will perform the head-severing operation quickly and cleanly.

Another object of the invention is to utilize apparatus which can be adjusted automatically to sever the heads from the bodies of fish of different size and which will minimize the waste of edible meat of the fish whatever its size within the range of fish size for which the beheading apparatus is adapted.

The foregoing objects can be accomplished by apparatus which will automatically place a fish in the proper attitude for accomplishing the beheading operation and will then transport the fish past beheading mechanism, and such beheading mechanism will operate in two stages: first, to effect a gill cut for cutting through the outer portions of the fish head root, followed by a final cutoff operation by which the head of the fish is severed from its body.

DETAILED DESCRIPTION

The ultimate objective of the present invention is to save as much edible meat as possible with the body of a fish while removing bony structure and inedible portions in a fish-beheading operation. Such objective is accomplished by cutting through the head root in two stages. The first stage cut, which can be designated as a gill cut, effects a partial severing of the fish head from the fish body beneath the gill covers and under and behind the pectoral girdle. The second stage of the beheading operation effects final severance of the fish head from the body and is made perpendicular to the longitudinal central plane of the fish at an angle between about 80 degrees and 100 degrees to the longitudinal axis of the fish and passes through the gill covers. This second stage cut is located sufficiently close to the leading end of the snout of the fish to preserve with the fish body as much as possible of the edible meat of the nape of the fish at the root of the fish head and may be designated as the severance cut.

It is not economically practical to hand-butcher fish, a major portion of the butchering operation being to sever the head of a fish from its body. In severing the head mechanically, however, consideration should be given to beheading fish of different size and species. The present invention is particularly adapted to the beheading of salmon and is adapted to sever the heads from the bodies of fish of different size.

Figure 1:
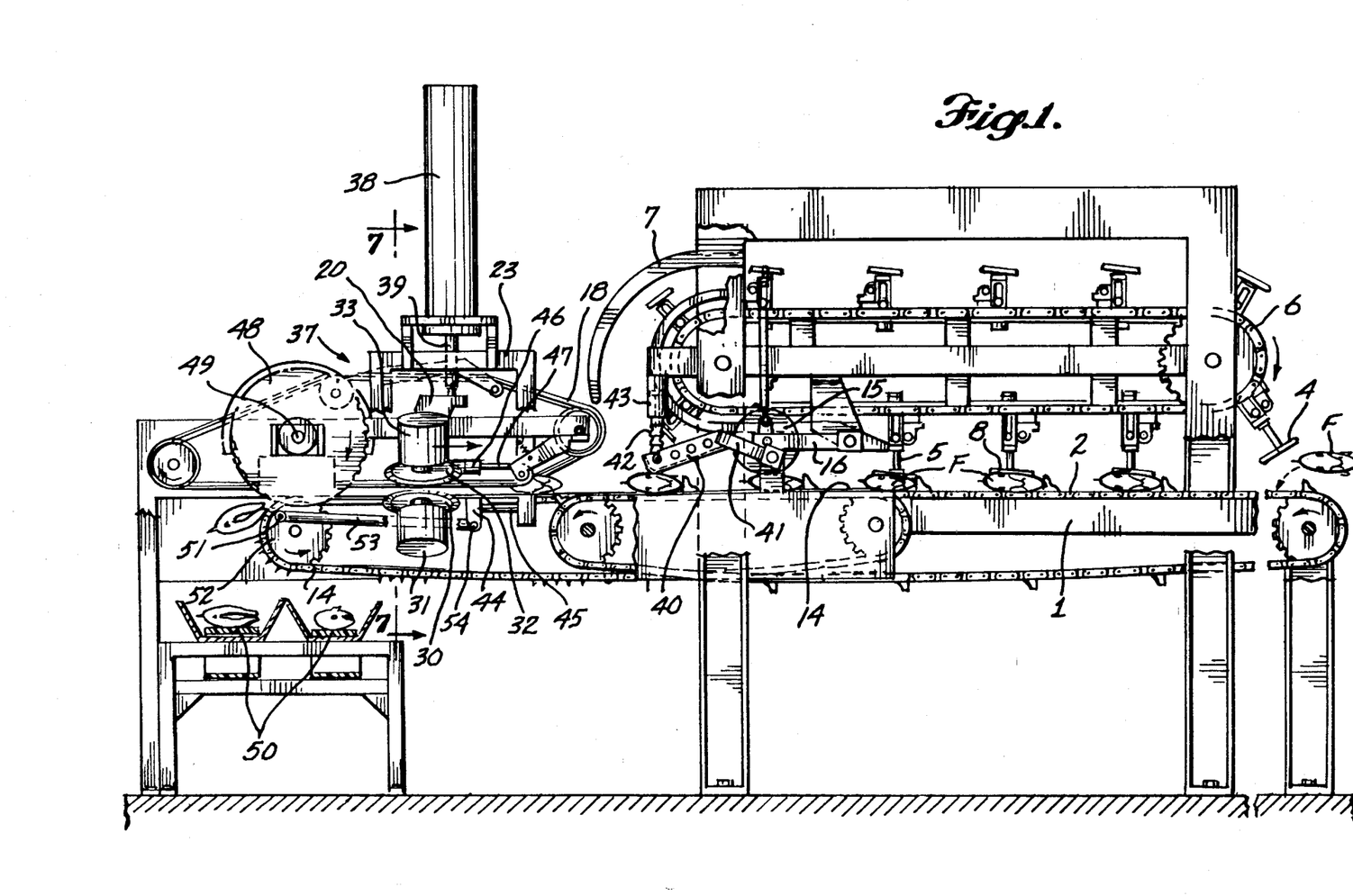
FIG. 1 is a side elevation of the fish-heading apparatus shown somewhat diagrammatically.
Figure 2:
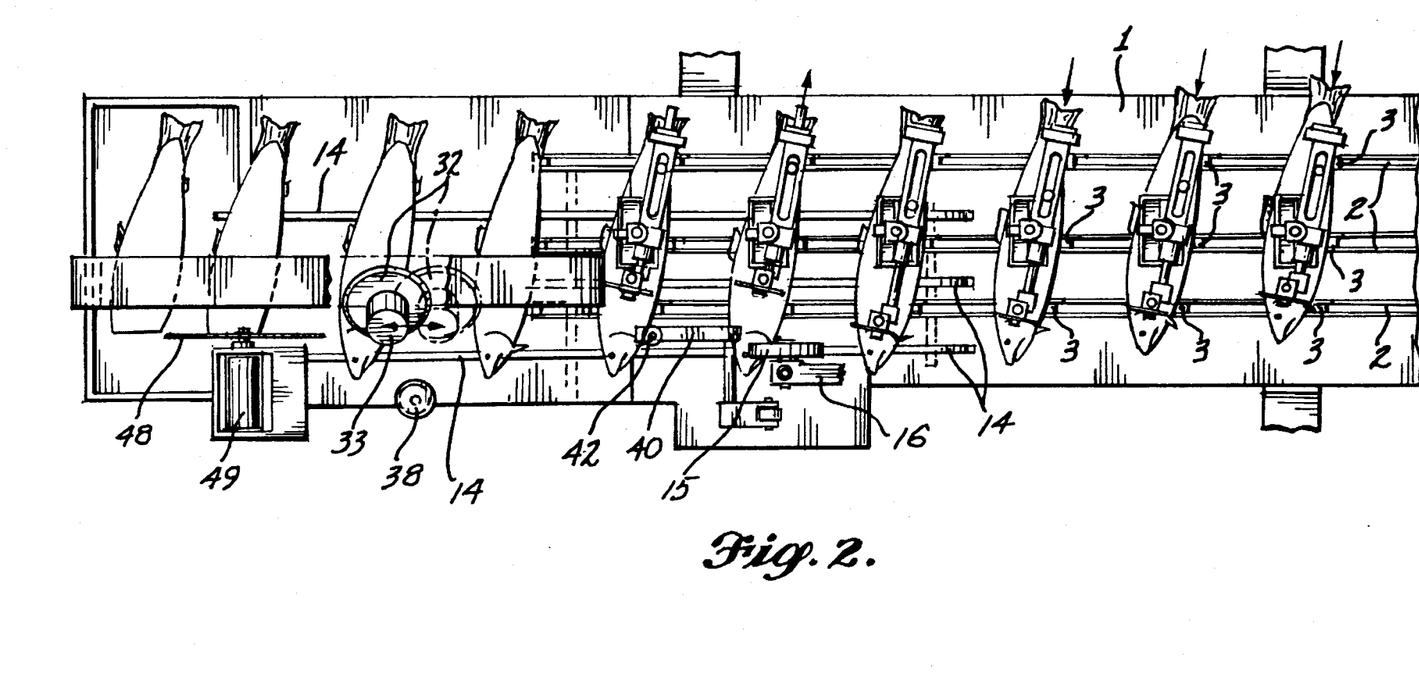
FIG. 2 is a horizontal section through the apparatus with parts broken away.

The apparatus of the present invention is composed of two sections, an initial placement section in which the fish is positioned properly for having its head cut off, and a subsequent cutting section in which two sequential cutting operations are performed. Both the placement section and the cutting section of the apparatus are shown in FIGS. 1 and 2.

Figure 3:
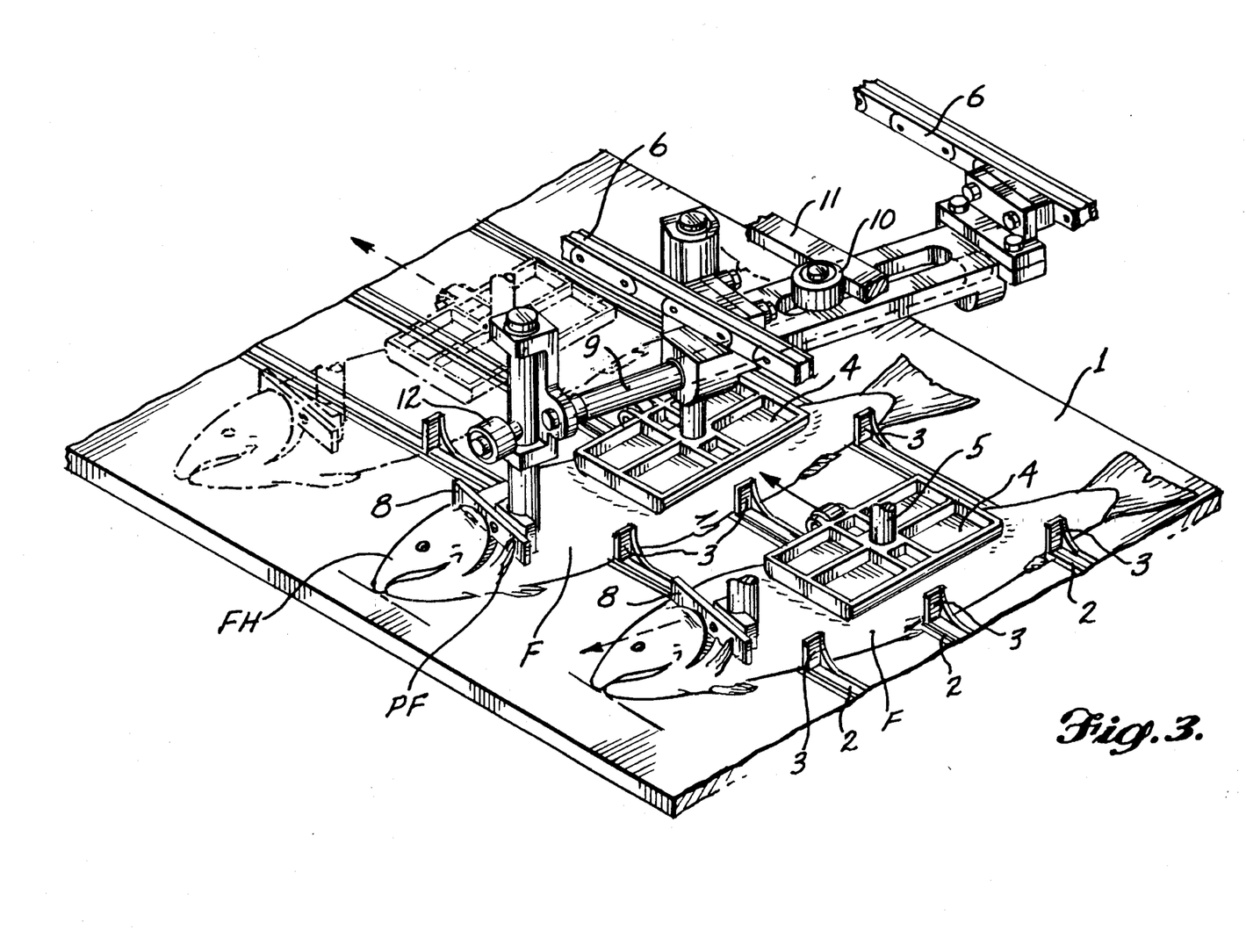
FIG. 3 is a top perspective through a portion of the apparatus with parts broken away.
Figure 4:
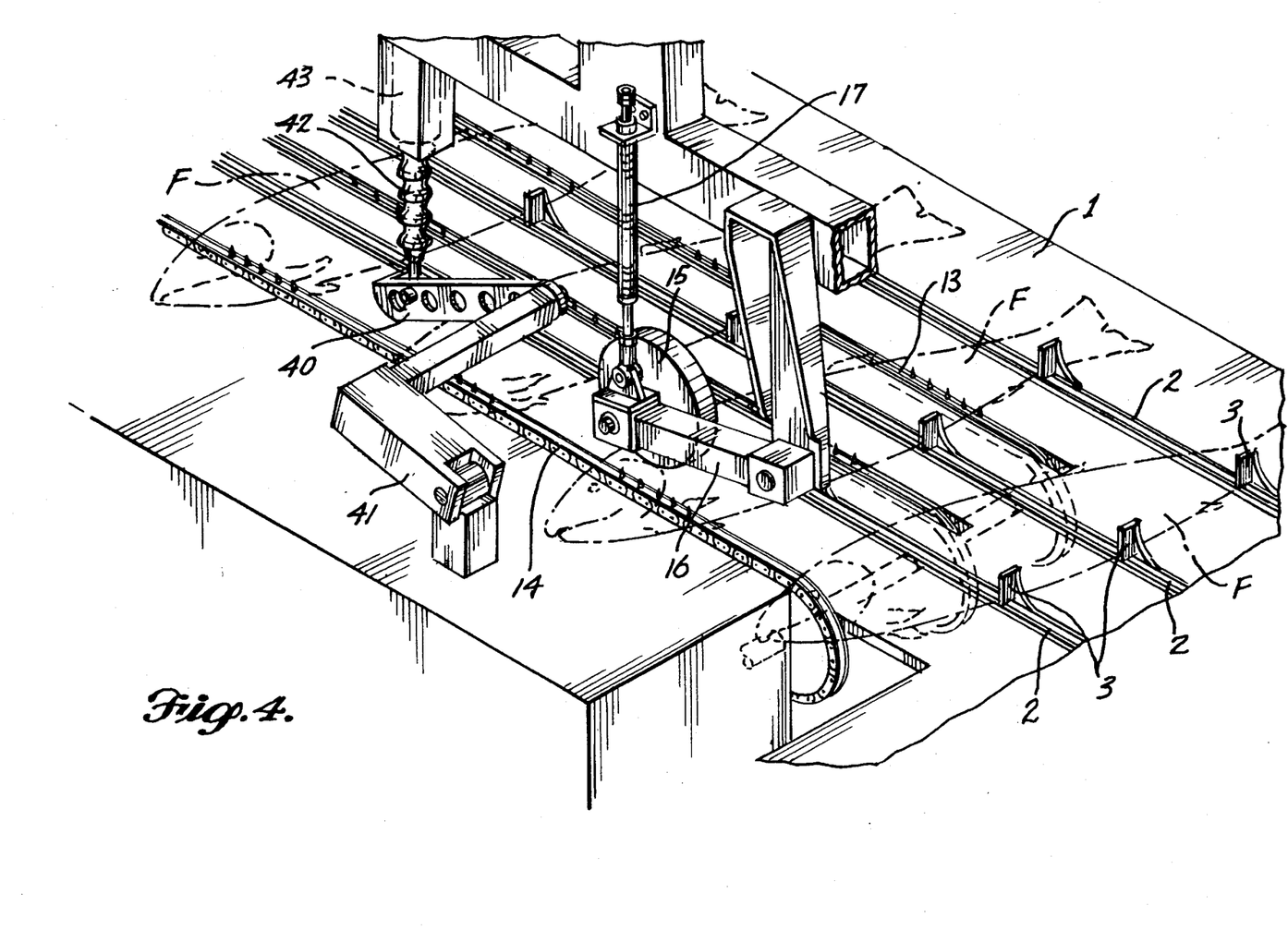
FIG. 4 is a top perspective through another portion of the apparatus with parts broken away.

The placement section of the apparatus includes a feed table 1 over which transport chains 2 travel from the feed end of the table to the cutting section. Three transport chains are shown in FIGS. 2, 3 and 4 carrying lugs 3. These chains are arranged so that the lugs of the two outer chains are ahead of the lugs of the central chain so that a line connecting the lugs would conform generally to the trailing side of a fish lying on the feed table 1 on its side with its length extending transversely of the table and back first. Moreover, the lugs are arranged so that the head end of a fish pushed by the lugs would lead the tail end of the fish, with the longitudinal axis of the fish inclined about 10 degrees relative to a line perpendicular to the direction of travel of the lug chains.

A fish can be placed on the feed end of the table 1 ahead of a set of lugs of the three chains 2 without the fish being located precisely in a desired angular attitude or lengthwise position. Engagement of the three lugs 3 with the belly of the fish effected by sliding of the chains 2 under the fish will swing the fish into the desired angular attitude relative to its direction of travel. The fish will then be moved along the table 1 transversely of its length by the transport chains.

Each fish is held down by a hold-down shoe 4 supported by a vertical shaft 5 for elevational movement by lengthwise reciprocation of the shaft. Such hold-down shoe contacts the fish after it has been engaged by lugs 3 of the transport chains as indicated in FIG. 1. The shafts 5 supporting the shoes are carried by upper chains 6 relative to which the shafts are elevationally movable to enable the shoes 4 to engage fish of different thickness with approximately the same pressure. The speed of such upper chains is synchronized with the speed of the lower chains 2 so that the shoes 4 continue to hold the fish down on the table as it is moved along the table by the lugs 3.

The mounting of the shafts 5 on the chains 6 is such as to enable the shafts to slide lengthwise downward for retracting the hold-down shoes 4 toward chains 6 as they are moved by these chains along the upper stretches of their orbits as indicated in FIG. 1. Retracting movement of the shoes toward chains 6 is effected by their engagement with curved guides 7 at the end of the placement section of the apparatus adjacent to the feed end of the cutting section. The shoes ride against the guides 7, the curvature of which is closer to the chains 6 at the upper portion of the guides than at the lower portion of the guides, so that the shafts 5 will be slid downward.

In the placement section it is necessary to shift the fish F headward by positioning mechanism to place it in a precise lengthwise position as required to enable the subsequent cutting operations to be performed at precisely the desired locations for severing the fish head FH from the fish body. Consequently each fish should be put on the feed table 1 with its head somewhat withdrawn transversely of the table from the desired location to be established by the positioning mechanism in the placement section of the apparatus. From its initial position the fish is pushed headfirst by pushers 8 reciprocable generally lengthwise of the fish and transversely of the direction of movement of the chains 2.

Such pushers are supported by shafts 9 that are reciprocated by cam follower rollers 10 connected to such shafts riding along suitably contoured cam tracks 11. Engagement of a cam follower 10 with a cam track 11 will reciprocate shaft 9 in a direction such that the pusher 8 in engagement with the gill cover or pectoral girdle of the fish will move the fish headfirst in the direction indicated by the arrows in FIG. 1 and the arrow in FIG. 3 to a precise predetermined position relative to the chains 2. The pusher 8 can then be lifted out of engagement with the fish by a second cam follower roller 12 rolling up an inclined track (not shown). The pusher mounting structure as well as the shoes 4 is carried by the upper chains 6 as shown in FIG. 3.

Pressure of the hold-down shoe 4 on a fish will not prevent it from being slid headwise by the pusher 8 into the proper placement transversely of the table but such pressure will resist such movement to a sufficient extent that inertia of the headward movement will not continue movement of the fish after the pusher 8 has been withdrawn from contact with the fish.

As shown in FIG. 4, spike chains 13 are located between the transport chains 2 for supporting and continuing to move the fish transversely of their lengths beyond the discharge ends of the transport chains 2 adjacent to the discharge end of the placement section. As shown in FIG. 4, one of these spike chains 14 is located headward of the root of the fish head. When a fish has been positioned lengthwise properly by a pusher 8 as described above, the portion of the fish head adjacent to its root will be impaled firmly on the spikes of the chain 14 by engagement with the upper side of the fish head of a presser wheel 15 journaled on the swinging end of a pivoted mounting arm 16. The presser wheel 15 is urged downward against the fish head by a force-exerting strut 17 containing a compression spring or other force-producing mechanism tending to elongate the strut for exerting a downward force on the swinging end of arm 16.

As shown best in FIG. 1, the lower transport chains 2 and the upper chains 6 carrying the hold-down shoes 4 and mounting mechanism for pushers 8 terminate at the discharge end of the placement section of the apparatus. Transport of the fish through the cutting section of the apparatus is then continued by the spike chains 13 and 14 against which the fish are held by a hold-down belt 18. If desired, a continuous transport arrangement could extend from the feed end of the placement section to the discharge end of the cutting section either in the form of transport chains having lugs as shown in the placement section or spike chains and an upper hold-down belt or belts such as provided in the cutting section.

Figure 6:
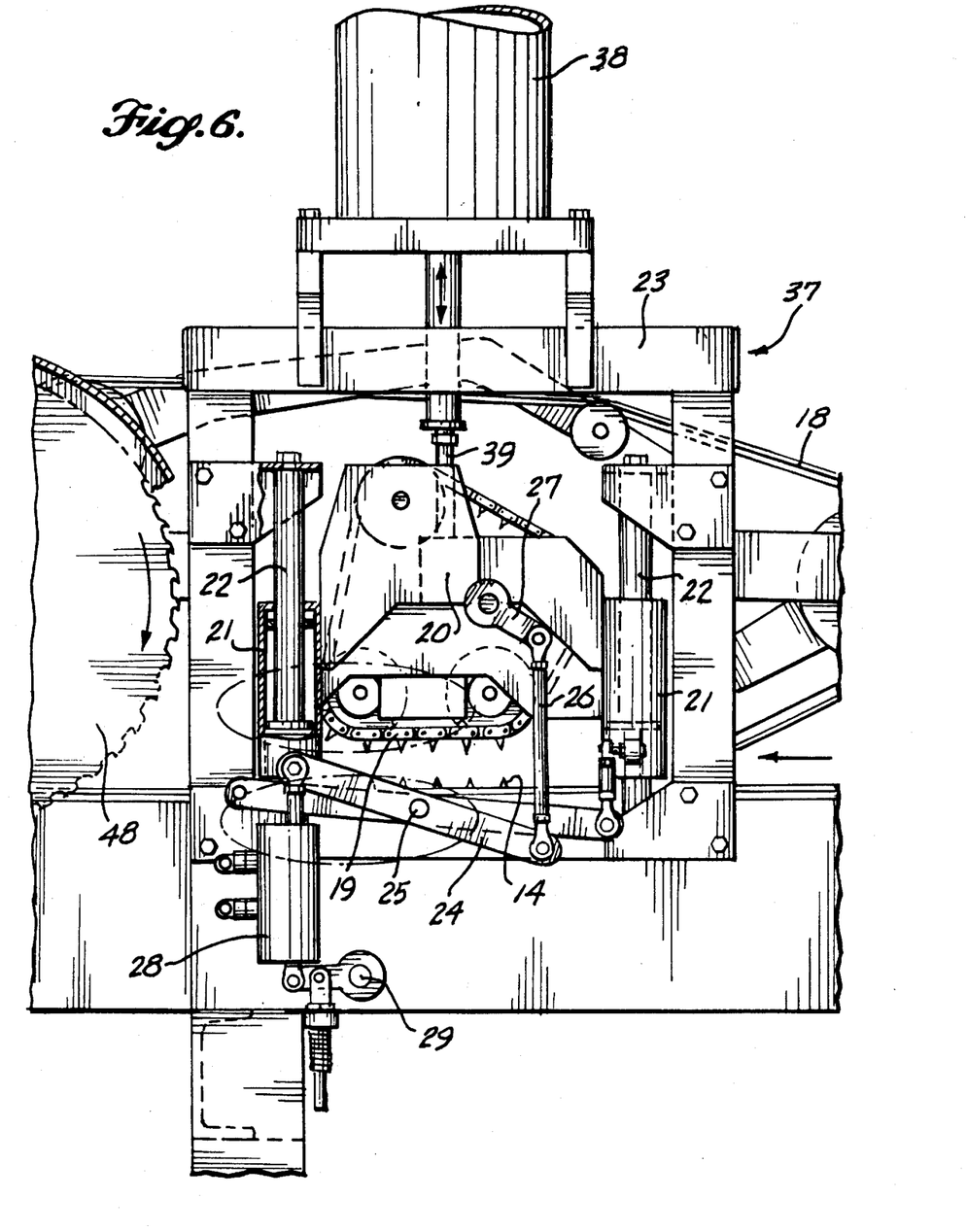
FIG. 6 is an enlarged side elevation of a portion of the apparatus with parts broken away.
Figure 7:
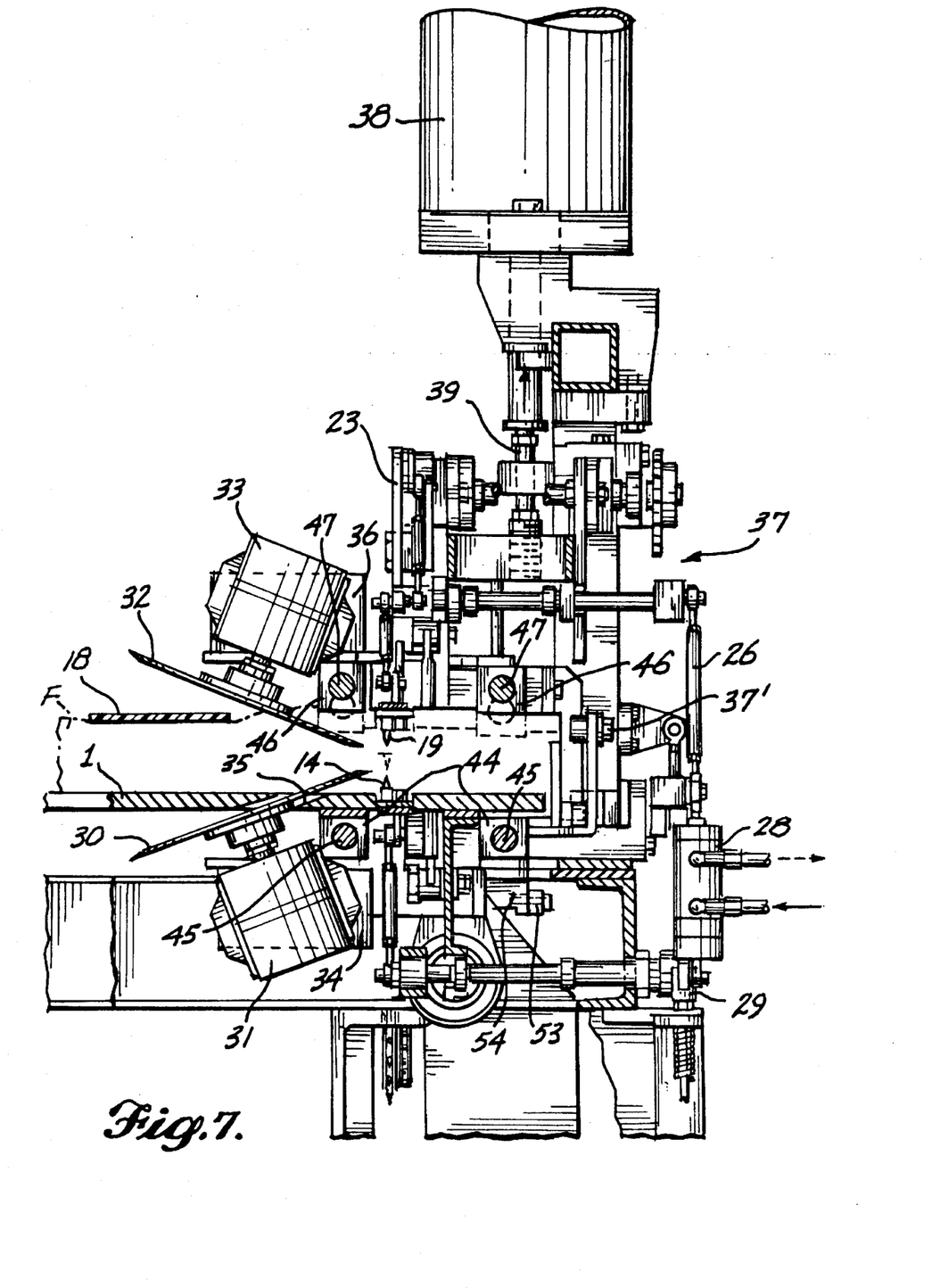
FIG. 7 is a transverse vertical section through a portion of the apparatus taken along line 7—7 of FIGS. 1 and 5.

In order to effect a positive transport of the fish head through the cutting section of the apparatus after the first or gill cut, an upper spike chain 19 shown in FIGS. 6 and 7 is provided for cooperation with the lower spike chain 14. The upper spike chain 19 is elevationally movable, being carried by a support 20 having guide sleeves 21 at its corners slidable along posts 22 that are carried by the frame 23. Yieldable downward pressure is exerted on the support 20 by a lever 24 tiltable about a mounting fulcrum 25. One end of that lever is connected by a link 26 to a second link 27 pivoted on the support 20. An upward force is exerted on the end of lever 24 remote from link 26 by a piston and cylinder 28 which is carried by an elevationally adjustable mount 29.

The gill cut of the fish is accomplished by two rotating cutting disks that are mounted in planes convergent toward the head of the fish. As shown in FIG. 7, such cutters include a lower cutting disk 30 directly mounted on the shaft of a drive motor 31. The upper cutting disk 32 is directly mounted on the shaft of a second drive motor 33. The lower motor 31 is mounted on a motor mount 34, and the cutting disk 30 projects through a slot 35 in the feed table 1 at an angle between 10 degrees and 25 degrees and preferably about 15 degrees to the feed table. The upper motor 33 is mounted on a motor mount 36 so that its cutting disk 33 also is disposed at an angle of 10 degrees to 25 degrees to the feed table 1 and preferably at an angle of about 15 degrees. The planes of the cutting disks 30 and 32 converge toward the head of the fish at an angle of 20 degrees to 50 degrees and preferably about 30 degrees. The motors 31 and 33 are mounted by the mounts 34 and 36 on a carriage 37 with their rotative axes in a vertical plane perpendicular to the feed table 1 and at an included angle of 130 degrees to 160 degrees, preferably about 150 degrees, which angle is the supplement of the included angle between the planes of the cutting disks 30 and 32.

The angle between the planes of the cutting disks 30 and 32 is selected, and the location of the cutting disks lengthwise of the fish is located such that the cutting disks will cut just behind the pectoral girdle of a fish and forward from that location beneath the gill covers of the fish. The mounting of the motor mounts 34 and 36 can be adjustable to enable the angle between the cutting disks to be selected.

In fish of different size, the spacing between the pectoral girdle sections at opposite sides of the fish will be different because of the difference in thickness of such fish. Consequently, in order to effect the gill cut at the most favorable location to preserve the greatest amount of meat attached to the fish body, it is desirable to alter the spacing between the cutting disks 30 and 32 in accordance with the thickness of the fish being beheaded. Since the fish is being transported on the feed table 1 on its side, the elevational position of cutter 30 need not be changed. Only the elevation of the upper cutter 32 need be adjusted to perform the most economical cut on fish of different thicknesses.

In order to position the upper cutter 32 elevationally to make the upper gill cut in the most desirable position on a particular fish, the mount 36 for the upper motor 33 is mounted on the support 20 which is elevationally adjustable relative to the frame 23. Such elevational adjustment is effected by an actuator 38 also mounted on carriage 37 which includes a ball-bearing screw 39 that is attached to the support 20 as shown in FIGS. 6 and 7.

It is necessary for the elevation of cutter 32 for cutting a particular fish to be established before the fish arrives at the gill-cutting station. Consequently, the thickness of the particular fish is sensed when the fish is in a position a considerable distance in advance of the gill-cutting station. Such position is established by the sensor 40 shown in FIGS. 4 and 5. The sensor is mounted on the end of an arm 41 pivoted to swing about an axis extending generally parallel to the length of fish being transported by the transport chains 2 and perpendicular to the direction of movement of such chains. The sensor can be moved upward by engagement with it of a portion of a fish transported by chains 2 at approximately the location at which the gill cut is to be made. Lifting of the sensor 40 will move a rod 42 lengthwise upward in control mechanism 43 for the ball-bearing screw actuator 38. The control mechanism 43 may be in the nature of a linear rheostat with suitable memory which will delay setting of the ball-bearing screw actuator 38 for a particular fish engaged by sensor 40 until that fish has almost reached the gill-cutting station defined by cutting disks 30 and 32.

It is desirable for the capacity of the beheading apparatus to be as great as possible for an apparatus of predetermined size. The capacity of the apparatus is determined by the speed of the fish transport mechanism and by the proximity of the fish on the apparatus. A certain amount of time is required to adjust the elevational position of upper cutting disk 32 between the operations of effecting gill cuts on adjacent fish. While the fish could be spaced apart on the transport mechanism at intervals sufficient to allow time between succeeding fish arriving at the gill-cutting station to effect the desired spacing adjustment of the cutting disk 32, it is preferable to minimize the spacing between the fish to maximize the beheading capacity of the apparatus.

To afford time for adjusting the cutting disk spacing between closely-spaced fish, the carriage 37 carrying the gill-cutting mechanism of the apparatus is mounted for reciprocation lengthwise of the direction of transport of the fish. Thus such gill-cutting mechanism will be advanced in the direction of fish feed while the cutting disks 30 and 32 are located between adjacent fish. During such positioning of the cutting disks, the upper cutting disk 32 can be adjusted elevationally to effect the upper gill cut in the desired location on the next fish. When the apparatus has moved the fish a predetermined distance, the carriage 37 will be retracted oppositely to the direction of fish travel, during which movement the gill cut will be effected. Such opposite motion will be continued until the gill-cutting station cutting disks 30 and 32 have reached a position between the next two adjacent fish on the transporting mechanism. The direction of travel of the carriage 37 will then be reversed to move the carriage in general synchronism with the direction of fish travel for a predetermined distance until the direction of travel of the carriage is again reversed.

To enable the mechanism at the gill-cutting station to be reciprocated relative to the fish feed table 1 in the manner described above, such mechanism is mounted on the reciprocable carriage 37. The lower cutting disk motor mount 34 and associated mechanism is mounted on one of the sleeves 44 of such carriage slidable on spaced parallel stationary rods 45 shown in FIG. 7. Correspondingly, the mount 36 for the motor 33 of the upper cutting disk 32 is mounted on one of the sleeves 46 reciprocable lengthwise of guide rods 47 shown in FIGS. 5 and 7. The lower sleeves 44 and upper sleeves 46 are connected together by the bridging structure 37'. The upper sleeves 46 and guide rods 47 are movable elevationally with the upper cutting disk 32 by the ball-bearing screw actuator as described above.

Figure 5:
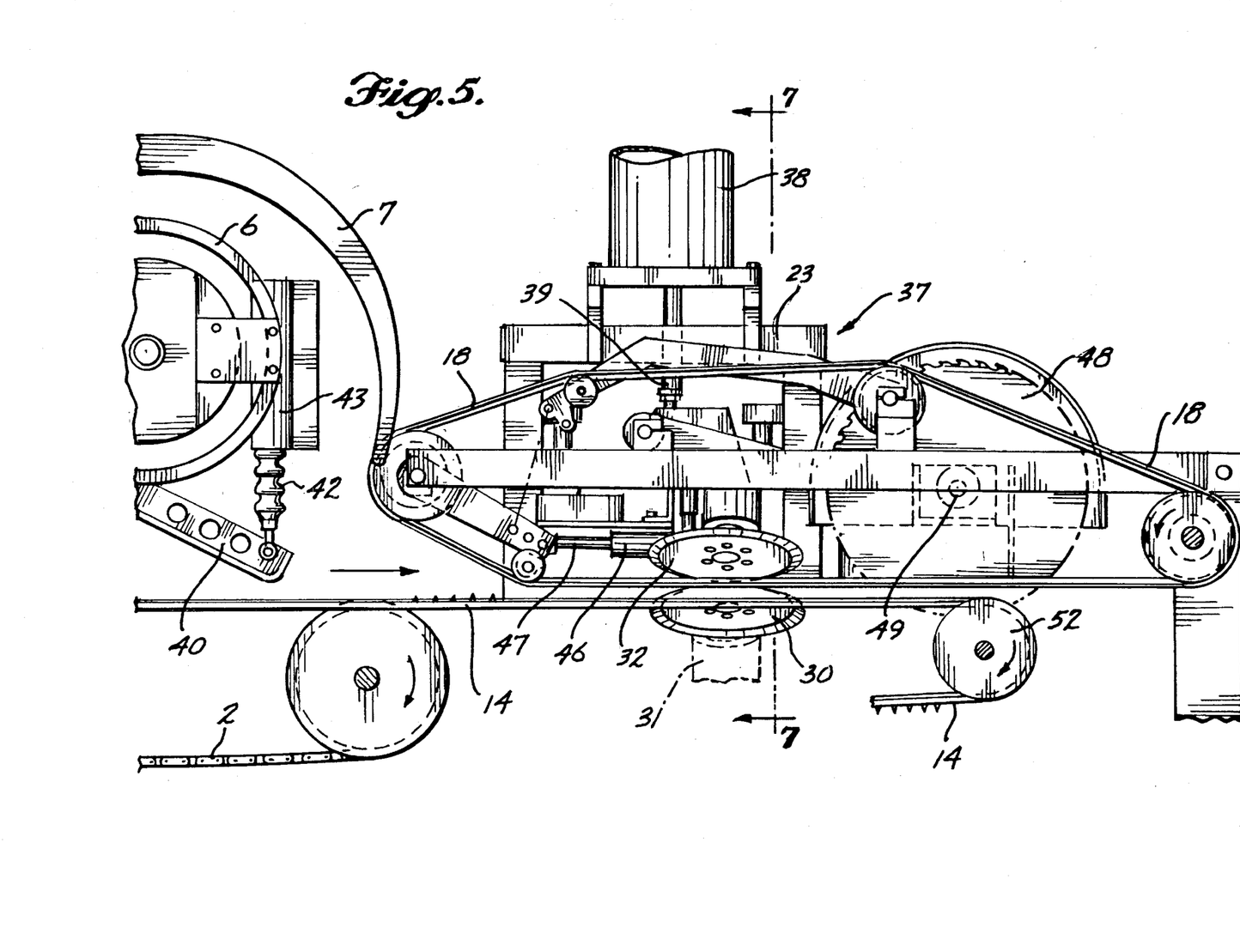
FIG. 5 is a side elevation of a portion of the apparatus with parts broken away.

The cutting disks 30 and 32 and the other mechanism of the apparatus at the gill-cutting station are shown in the position advanced in the direction of fish movement in FIGS. 1 and 5 and diagrammatically in full lines in FIG. 2, and the position that would be occupied by the cutting disks 30 and 32 retracted opposite to the direction of fish movement is indicated in broken lines in FIG. 2. Thus FIG. 2 indicates the extent of reciprocation which would be effected by the reciprocating carriage 37 during transport of a single fish through the gill-cutting station, which is approximately half the spacing of adjacent fish.

Figure 8:
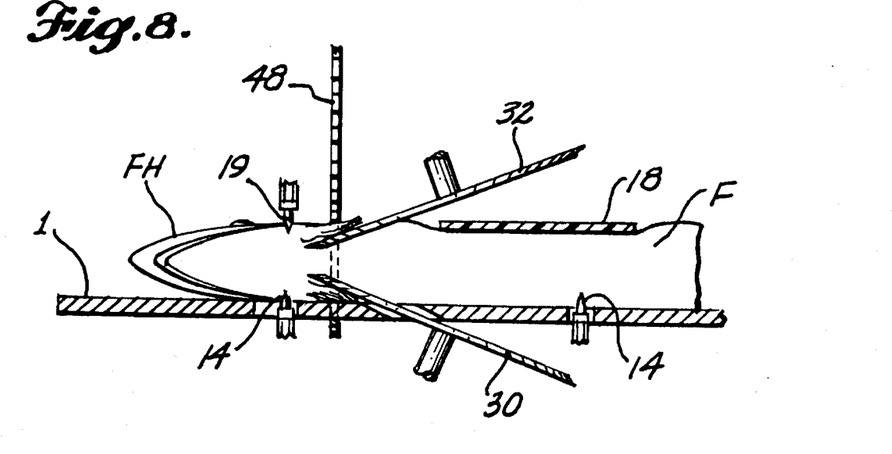
FIG. 8 is an elevation of a portion of a fish looking at the belly side of the fish and showing the first stage cut being made.
Figure 9:
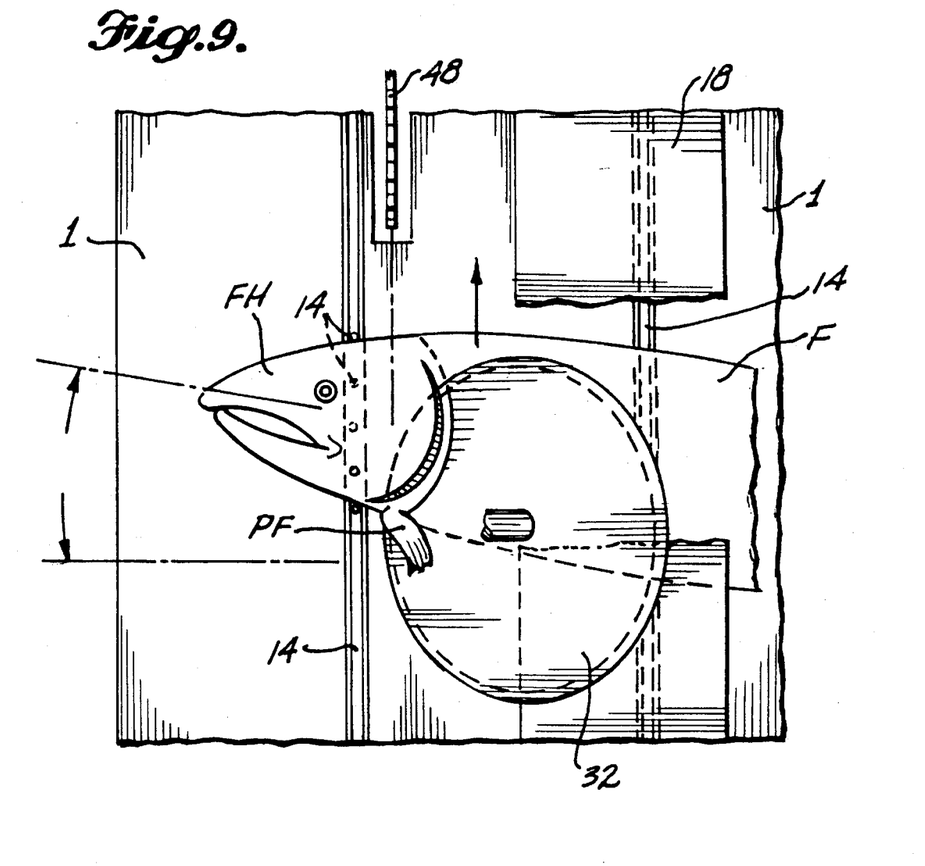
FIG. 9 is a plan of a portion of a fish showing the first stage cut nearing completion.

During passage of the fish through the gill-cutting station, the cutting disks 30 and 32 will cut beneath the collarbone and the gill covers and the inedible portions of the gills but, after passage of the fish through the gill-cutting station, the fish head will be still be connected to the body of the fish by the backbone and meat at the root of the fish head between the gill-cutting disks 30 and 32. As indicated in FIG. 8, in order to complete the severance of the fish head from the body, it is therefore necessary to cut through this remaining fish head to fish body connection. Such severance cutting is effected by the cutting disk 38 in the manner indicated in FIGS. 2 and 9.

As shown in FIGS. 1, 2 and 5, the cutoff disk 48 is disposed in a vertical plane parallel to the direction of movement of the fish and is driven by a motor 49, the shaft of which extends generally parallel to the length of the fish and transversely to the direction of transport of the fish along the feed table 1. The cutoff disk 48 will cut through the root of the fish head at the nape, through the gill covers, through the connection between the fish head and the fish body not severed by the gill-cutting disks 30 and 32, and through the bases of the pectoral fins so that they will be removed from the fish body. The portions of the fish severed by the cutoff cutter 48 will drop into a transverse conveyor 50 shown in FIG. 1 for removal, and the beheaded fish will be discharged at the end of the cutting section onto a removal conveyor or into a bin as may be desired.

Various types of mechanism could be used to reciprocate the carriage 37 in the manner described above, such as a barrel-type cam, a crank and a connecting rod, or piston and cylinder mechanism. In FIGS. 1 and 7, the reciprocating mechanism is illustrated as a crank and pinion including a crank pin 51 mounted eccentrically on the end sprocket 52 of the spike chain 14. Such crank pin is connected by a connecting rod 53 to a pivot 54 on a lower sleeve 44 of the carriage 37 as shown in FIGS. 1 and 7.

By driving the reciprocating mechanism by the sprocket of the fish transport spike chain, it will be assured that reciprocation of the carriage 37 will be synchronized with the travel of the fish.

As the crank pin 51 descends at the left side of the sprocket 52 as seen in FIG. 1 during its counterclockwise rotation, the carriage will be advanced to its extreme position in the direction of travel of the fish. As the crank pin moves to the right along the lower arc of its travel, the carriage will be retracted in the direction opposite the direction of the movement of the fish until the crank pin reaches its extreme right position as seen in FIG. 1. The direction of carriage movement will then be reversed again to advance in the forward direction as the crank pin moves to the left around the upper arc of its orbit.

Operation of the actuator 38 for adjusting the elevation of the cutter 32 will occur during travel of the crank pin 51 around the upper arc of its orbit, at which time the carriage will be advancing in the direction of fish travel and at approximately the same speed as the fish with the cutters located in a space between adjacent fish. The cutting action will then occur at a speed of the fish relative to the gill-cutting disks 30 and 32 approximately twice the speed of travel of the fish along the table because the fish will be moving forward while the carriage 37 will be moving in the opposite direction at a speed approximately equal to the speed of travel of the fish.

I claim:

1. In fish-beheading apparatus including transport means for transporting fish on their sides transversely of their lengths and beheading cutting means for severing the fish head from the fish body, the improvement comprising the beheading cutting means including a pair of gill-cutting disks disposed in planes covergent toward the head of a fish and spaced apart a distance less than the thickness of the fish at the root of the head beneath the gill covers, and further including cutoff means engageable with the fish after being cut by said gill-cutting disks for completing the severance of the fish head from the fish body.

2. In the fish-beheading apparatus defined in claim 1, the cutoff means being a disk cutter rotatable about an axis extending transversely of the fish.

3. In the fish-beheading apparatus defined in claim 1, means mounting the gill-cutting disks for relative movement to vary their spacing in accordance with the thickness of a fish to be cut by the gill-cutting disks.

4. In the fish-beheading apparatus defined in claim 3, fish thickness sensing means, and means for adjusting the spacing of the gill-cutting disks in response to operation of the fish thickness sensing means.

5. In the fish-beheading apparatus defined in claim 4, the fish thickness sensing means being located in advance of the gill-cutting disks along the path of movement of the transport means.

6. In the apparatus defined in claim 3, carriage means carrying the gill-cutting disks and reciprocable in a direction parallel to the direction of movement of the fish by the transport means first in the same direction as the fish is moved by the transport means and at approximately the same speed and then in the direction opposite to the direction in which the fish is moved by the transport means.

7. In the fish-beheading apparatus defined in claim 6, the means for adjusting the spacing of the gill-cutting disks being mounted on the carriage means for reciprocation in the direction of movement of the fish conjointly with the gill-cutting cutters and operable to adjust the spacing of the gill-cutting disks while the carriage is moving in the same direction as the transport means.

8. In the fish-beheading apparatus defined in claim 1, the transport means including upper and lower spike chains engageable with the upper and lower sides of a fish head, respectively, at a location headward of the gill-cutting disks for clamping the fish head therebetween while the fish is moved past the gill-cutting disks.

9. In the apparatus defined in claim 1, the transport means including a spike chain beneath a fish, and presser mechanism for pressing the fish downward to impale the fish on said spike chain.

10. In fish-beheading apparatus including transport means for transporting fish on their sides transversely of their lengths and beheading cutting means for severing the fish head from the fish body, the improvement comprising transport means including a spike chain beneath a fish, and presser mechanism for pressing the fish downward to impale the fish on said spike chain; said presser mechanism including a presser wheel overlying the spike chain and rolling on the upper side of the fish, and means exerting a downward force on said presser wheel for effecting pressure of said presser wheel on the fish on which it is rolling.

11. The process of beheading a fish which comprises cutting partially through the fish at the root of the fish head and beneath the gill covers by cuts converging toward the head of the fish and in a subsequent operation cutting transversely of the fish the rest of the way through the fish for completing the severance of the fish head from the fish body.

* * * * *

UNITED STATES PATENT AND TRADEMARK OFFICE
CERTIFICATE OF CORRECTION

PATENT NO. : 5,458,535

DATED : October 17, 1995

INVENTOR(S) : Kenneth W. Bullock and Belvin L. Graham

It is certified that error appears in the above-identified patent and that said Letters Patent is hereby corrected as shown below:

Claim 1: column 7, line 30, after "head" insert --for cutting through only a portion of the fish head--.

Claim 10: column 8, line 33, cancel the semicolon after "chain" and insert a comma.

Signed and Sealed this

Twenty-second Day of October, 1996

Attest:

BRUCE LEHMAN

Attesting Officer

Commissioner of Patents and Trademarks